United States Patent [19]
Karl et al.

[11] Patent Number: 5,720,181
[45] Date of Patent: Feb. 24, 1998

[54] AIR CONDITIONING INSTALLATION, ESPECIALLY FOR A MOTOR VEHICLE

[75] Inventors: Stefan Karl, Paris; Béatrice Gach, Voisins Le Bretonneux, both of France

[73] Assignee: Valeo Climatisation, La Verriere, France

[21] Appl. No.: 771,394

[22] Filed: Dec. 19, 1996

[30] Foreign Application Priority Data

Dec. 22, 1995 [FR] France .................. 95 15423

[51] Int. Cl.$^6$ .................................. B60H 3/00
[52] U.S. Cl. .................. 62/180; 236/49.3; 454/258; 454/75; 165/248
[58] Field of Search .................. 62/180, 186, 203, 62/228.1, 228.3, 228.4, 228.5, 229; 236/49.3, 91 R, 91 C, 91 D, 91 E, 91 F; 454/75, 256, 258, 239; 165/202, 203, 204, 248, 249, 250

[56] References Cited

U.S. PATENT DOCUMENTS

| | | | |
|---|---|---|---|
| 4,917,293 | 4/1990 | Fedter et al. | 236/49.3 |
| 4,996,849 | 3/1991 | Burst et al. | 165/249 X |
| 5,301,515 | 4/1994 | Iritani et al. | 62/180 X |
| 5,590,540 | 1/1997 | Ikeda et al. | 454/258 X |

FOREIGN PATENT DOCUMENTS

| | | |
|---|---|---|
| 026 612 | 4/1981 | European Pat. Off. |
| 194 029 | 9/1986 | European Pat. Off. |
| 3624171 | 1/1988 | Germany |

OTHER PUBLICATIONS

French Search Report dated 27 Sep. 1996.

*Primary Examiner*—Harry B. Tanner
*Attorney, Agent, or Firm*—Morgan & Finnegan L.L.P.

[57] ABSTRACT

A motor vehicle air conditioning system includes an adjustable position air inlet valve for controlling the relative proportions of recirculated air and fresh air from outside entering the system. A first sensor and a second sensor give respective measurement signals representing the inside temperature of the cabin and the outside temperature. The occupant of the vehicle can set a required value of inside temperature on a data unit, which memorizing this setting. The installation includes a processor for computing the difference between the actual inside temperature and its required value, and for memorizing at least one first temperature threshold value. The processor makes a first comparison between this first threshold value and the computed absolute value of the temperature difference, and then performs a second comparison between the inside and outside temperatures. The installation also includes control means for positioning the air inlet valve as a function at least of the first and second comparisons: this enables the temperature inside the cabin to be adjusted.

8 Claims, 1 Drawing Sheet

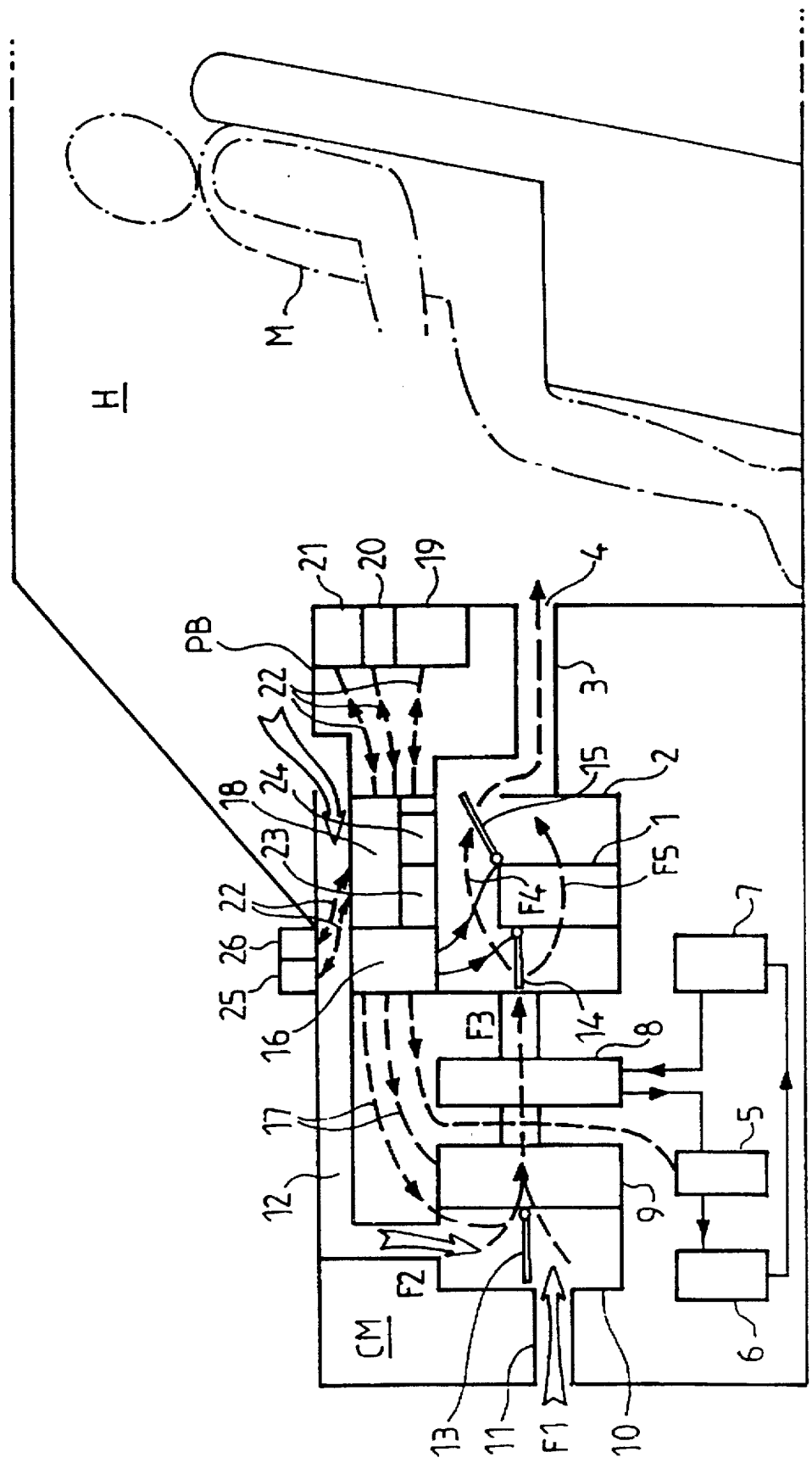

AIR CONDITIONING INSTALLATION, ESPECIALLY FOR A MOTOR VEHICLE

FIELD OF THE INVENTION

This invention relates to air conditioning installations or apparatus, especially for motor vehicles, and is concerned most particularly with means, included in such an installation, for automatically adjusting the prevailing conditions in a cabin of the vehicle.

BACKGROUND OF THE INVENTION

In the automotive field, it is known to provide an air conditioning installation, especially for the cabin of a motor vehicle, of the type comprising:
—an adjustable pressure compressor,
—an adjustable position air inlet valve, for controlling the proportion of recirculated air and/or fresh air from outside,
—a first sensor for giving a first measurement signal representing the temperature inside the cabin,
—a second sensor for giving a second measurement signal representing the temperature outside the cabin,
—data means for memorizing a required value of temperature set by an occupant of the vehicle,
—processing means for computing a temperature error between the first measured value and the said required value of temperature, and
—control means for acting on the compressor according to the said second measured value and the calculated temperature error.

When the vehicle is exposed to the sun for a long time, the inside temperature of the cabin is greatly increased as compared with the outside temperature. In addition, especially if the exposure to sunlight continues for a long period, the absolute humidity of the air in the cabin is increased greatly with respect to the outside ambient humidity.

In installations of the particular type set forth above, temperature is regulated by varying a single parameter, namely the pressure generated by the compressor. The air inlet valve cannot be actuated by the control means, at least at the start of the control or adjustment process. This valve is therefore in its closed position, in which air from outside the vehicle is unable to enter the installation. In consequence, the air which is to be cooled by the air conditioning apparatus is all taken from inside the cabin. Since this recirculated air is warmer, and may be very much hotter than the ambient air outside the vehicle, and since it is generally much more humid than the outside atmosphere, the time taken to cool this recirculated air is longer, and often very much longer, than would be the case if the air to be cooled were fresh air taken direct from outside.

Such installations accordingly involve difficulties in rapidly adjusting the atmospheric conditions inside the cabin, when the difference in temperature between the inside of the cabin and the outside is large. This is especially uncomfortable for the occupants of the vehicle.

DISCUSSION OF THE INVENTION

An object of the invention is to provide an air conditioning installation of the type defined above, which does not present the disadvantages of prior art installations, in particular during the initial phase, or starting phase, of the adjustment or control process.

According to the invention, an air conditioning installation, especially for the cabin of a motor vehicle, of the type comprising:
—an adjustable pressure compressor,
—an adjustable position air inlet valve, for controlling the proportion of recirculated air and/or fresh air from outside,
—a first sensor for giving a first measurement signal representing the temperature inside the cabin,
—a second sensor for giving a second measurement signal representing the temperature outside the cabin,
—data means for memorizing a required value of temperature set by an occupant of the vehicle,
—processing means for computing a temperature error between the first measured value and the said required value of temperature, and
—control means for acting on the compressor according to the said second measured value and the calculated temperature error,
is characterised in that the processing means comprise memory means for memorizing at least one first threshold value of temperature, and comparison means for performing a first comparison between the said first threshold value and the absolute value of the computed temperature error, and for then carrying out a second comparison between the inside temperature in the cabin and the outside temperature, and in that the control means are adapted to put the air inlet valve into a setting dependent on at least the said first and second comparisons, whereby to adjust the temperature inside the cabin.

According to a preferred feature of the invention, the air inlet valve can adopt at least two positions selected from an open position, in which only air from outside is able to enter the installation, and a closed position in which only recirculated air is able to enter the said installation.

Thus, in accordance with the result of the second comparison, or in other words according to whether the inside temperature is higher or lower than the outside temperature, the air inlet valve is automatically set in such a way that the air treated by the installation is either recirculated air, or fresh air from outside, or perhaps a mixture of both.

Preferably, each of the said first and second comparisons consists of a subtraction operation, which can be simply achieved with the use of electronic subtraction circuits.

In preferred embodiments of the invention, the installation further includes a third sensor for giving a third measurement signal representing the absolute humidity of the air inside the cabin, and a fourth sensor for giving a fourth measurement signal representing the absolute humidity of the air outside the cabin, and the comparison means of the processing means are adapted to carry out a third comparison, between the third measurement signal and the fourth measurement signal.

In preferred forms of such an embodiment, firstly, the memory means of the processing means are further adapted to memorize a second threshold value of temperature and a threshold value of humidity, the comparison means being adapted, after having carried out the first, second and third comparisons, to perform: a fourth comparison, between the absolute value of the result of the third comparison and the said humidity threshold value; a fifth comparison between the absolute value of the result of the second comparison and the said second temperature threshold; at least two operations on the absolute values of the results of the second and third comparisons respectively; and a sixth comparison between the results of the said two operations, and the control means are adapted to set the position of the air inlet valve according to the said first and sixth comparisons, which enables the humidity inside the cabin to be adjusted in addition to the temperature. This enables not only the temperature, but also the humidity, to be controlled within the cabin.

Each of the third, fourth, fifth and sixth comparisons preferably consists of a subtraction operation, which can, again, be achieved simply with the use of electronic subtracting circuits.

The invention enables several modes of interrogation to be applied to the sensors by the processing means. In a first mode, the first, second, third and fourth sensors are all interrogated at the same time. In a second mode, these four sensors are interrogated one after the other. In a third interrogation mode, both the sensors in one pair of sensors are interrogated at the same time, and the sensors of the other pair are then interrogated both at the same time, one of these pairs consisting of the first and second sensors and the other consisting of the third and fourth sensors.

In the first of these interrogation modes, processing of the measurement signals is carried out in parallel, using for example a parallel interface, which enables the processing time to be reduced and therefore gives a reduction in the time necessary for the selection of the required position of the air inlet valve. By contrast, in the second interrogation mode mentioned above, a serial interface can be used, or alternatively a single input-output; interrogation of a sensor and the processing of its measurement signal can only be carried out after the last preceding measurement signal has been processed. The third interrogation mode given by way of example above is an intermediate mode.

Accordingly, the installation is adaptable for the use of different types of electronic control means which can be of greater or less sophistication, and in which the processing of the measurement signals from the various sensors can be carried out either in series or in parallel.

Further features and advantages of the invention will appear more clearly on a reading of the following detailed description of some preferred embodiments of the invention, which is given by way of non-limiting example only and with reference to the accompanying drawing.

BRIEF DESCRIPTION OF THE DRAWING

The single FIGURE of the drawing shows diagrammatically, in cross sectional side elevation, part of a vehicle equipped with the installation according to the invention, in a preferred embodiment of the invention.

DESCRIPTION OF PREFERRED EMBODIMENTS OF THE INVENTION

The air conditioning installation shown in the drawing is the cold loop or branch of a heating and air conditioning installation for the cabin H of a motor vehicle. The installation is housed within the engine compartment CN and below the fascia panel PB. The heating and air conditioning installation also includes a hot loop or branch, which includes a heating radiator 1 mounted within the casing of an air heating and distributing unit 2, which is arranged for distributing the air which is treated by the air conditioning installation into ducts 3, which exhaust into the cabin H via distribution vents 4. The cold, or air conditioning, branch comprises, in particular, an adjustable pressure compressor 5 for compressing a refrigerant fluid in the form of a hot gas, a condenser 6 for condensing the hot gas into a hot liquid, an expansion device 7 for reducing the pressure of the hot liquid by expanding it and converting it into a cold fluid in liquid and gaseous form, and an evaporator 8 for converting this fluid into cold gas, which is then returned to the compressor 5 so as to cool the air which passes through the compressor.

This air is emitted from a variable flow blower 9, which is itself supplied with air from a suction chamber 10. A first duct 11 and a second duct 12 supply the air to the suction chamber 10. The first duct 11 is a fresh air inlet duct, delivering air in the direction F1, while the second duct 12 supplies, in the direction of the arrow F2, recirculated air taken from the cabin H. The suction chamber 10 contains a first air inlet valve 13, which is operated by an actuator of the electromechanical or pneumatic type, and which regulates the percentage of fresh air and/or recirculated air that is to be treated either by the cold loop or by the hot loop.

The air from the suction chamber 10 therefore enters the blower 9, passes through the evaporator 8, and then exhausts into the air heating and distribution unit 2, which includes, within its casing, a second air valve 14 for distributing the air. This air distribution valve 14 is controlled by an actuator of the electromechanical or pneumatic type, and regulates the percentage of cold treated air passing in the direction indicated by the arrow F4, or that of the air to be treated by heating, the path of which is indicated by the arrow F5. This is with a view either to the distribution of these air streams directly into the cabin H, or to the mixing of these air streams before they are delivered into the cabin. To this end, the unit 2 includes, downstream of the heating radiator 1, a treated air mixing valve 15 for adjusting the percentage of the mixture of cold treated air and hot treated air. The valve 15 is again operated by an actuator of the elecromechanical or pneumatic type.

The actuators of the various valves 13, 14 and 15 are not shown in the drawing. These actuators, and the blower 9, are controlled and operated by a control unit, or electronic controller, 16, which consists of conventional electronic components well known to the person skilled in the art. The controller 16 addresses commands to the valve actuators and the blower via cables 17. The electronic controller itself receives orders, or messages, from a processing means, or processor, 18, to which reference will be made later herein, and also from a data unit 19, which is generally provided with push buttons or rotary or sliding knobs, and touch pads, enabling the user M to set various required values of atmospheric and thermal parameters, for example that of the temperature at a given place in the cabin. The processing means 18 and the electronic controller 16 are mounted below the fascia panel PB, or in the engine compartment CM at the front of the vehicle.

The data unit 19 preferably includes a memory for memorizing the various values of parameters which are set by the user, and in particular the temperature setting which serves as the basis for the adjustment process.

This adjustment also makes it necessary to provide at least two other values of parameters, namely those of the temperature T1 inside the cabin and the temperature T2 outside the cabin. These values are obtained by means of a first sensor 20 in the cabin, and a second sensor 21 on the outside of the vehicle, respectively. The sensors 20 and 21 are connected to the processor 18 through cables 22, which allow passage of signals in both directions. It is of course possible to provide a wireless connection between the sensors and the processor. Each sensor 20 or 21 is preferably a temperature sensor which gives an electrical measurement signal Ti that represents the actual temperature at the location of the sensor. It will however be clear that any other suitable type of sensor may be used, for example a heat flux sensor.

The processor 18 receives these electrical signals, and then, if required, puts them into a suitable form for enabling them to be compared with the preselected temperature setting, or indeed with other measurements of temperature or other parameters. The operation of putting the signals into the required form may for example consist of a simple pass band filtering operation which suppresses or attenuates parasitic signals; equally, it may consist of a conversion of the analogue to digital type, using an analogue/digital converter.

Preferably, each signal, having been put into the correct form, is stored in a memory 24 of the processor 18 for later use, and in particular for the purpose of making comparisons of the subtraction type, which are performed by an electronic subtractor circuit 23 of the processor 18, the circuit 23 having two inputs and one output. The result of the subtraction operation is able to be delivered in the form of a difference in potential (voltage), or in the form of a current having an intensity proportional to the result of the subtraction. In this embodiment, a voltage is preferable because it not only has an amplitude but also a sign (positive or negative). In the simplest version of the proposed installation, the installation has only the two temperature sensors 20 and 21, which are mounted, respectively, in the cabin and on the outer surface of the bodywork of the vehicle in a suitable protected position.

The preferred method of operation of the installation is as follows. After entering the vehicle, the user sets the required value of inside temperature TC using the data unit 19, which then addresses this value to the processor 18, which stores it in the memory 24. The processor 18, informed by the reception of the temperature value TC of a possible need to adjust the temperature in the cabin, then interrogates the two temperature sensors 20 and 21. This interrogation is carried out either simultaneously on both sensors, if the installation is equipped with a processor/sensor interface of the parallel type, or in two steps if the installation is equipped with a serial interface.

The two measurements T1 and T2, issued respectively from the first sensor 20 and the second sensor 21, are then memorized in the memory 24 of the processor, after any operation to put the signal in the correct form, as indicated above, has been carried out.

The memory 24 also contains a section of the rewritable type, containing a temperature threshold S1, which is more exactly a temperature error limit threshold value, beyond which it is considered that the purpose of the adjustment has been achieved. This threshold value is stored in the memory before the processor is fitted into the vehicle. However, it can be envisaged that this threshold value may be replaceable by another threshold value. In that case, the processor must for this purpose include an input-output which enables it to be connected to a programming unit of the portable microcomputer type. On receipt of the measured value of the inside temperature T1, the processor 18 carries out a first subtraction operation between TC and T1, which provides a first temperature error E1 which is memorized in the memory 24 in a predefined position. The processor 18 then carries out a first comparison between the threshold S1 and the absolute value of the error E1. This comparison also consists of a subtraction operation. Subsequently, or at the same time, a second comparison is carried out between the measured values of the inside temperature T1 and the outside temperature T2. This comparison again consists of a subtraction operation.

According to the results of the first and second comparisons, the processor 18 is arranged to address to the electronic controller 16 a message instructing it to act on the air inlet valve 13, by positioning the latter either in an open position, in which only fresh air can be treated by the installation, or in a closed position in which only recirculated air can be treated by the installation. Opening of the valve will tend to reduce the value of the internal temperature rapidly, and also its absolute humidity content, when the inside temperature is higher than the outside temperature. However, in this simple type of embodiment, it is not possible to control the inside humidity precisely.

Two broad cases (I) and (II) now present themselves, as follows.

(I) If the condition "S1–E1<0" is verified, so that the temperature error between the required value TC and the inside temperature T1 is greater than the limit threshold (T1≠TC), which means that the purpose of the adjustment has not been achieved, the adjustment is in a phase which is referred to as the starting phase. Two cases then present themselves, as follows:

(a) If the condition "T1–T2>0" is verified, it is then necessary to use the fresh air from outside rather than the recirculated air from inside, because the former is warmer than the second. In consequence, it is necessary to open the air inlet valve 13.

(b) If the condition "T1–T2<0" is verified, it is then necessary to use the recirculated air from inside rather than the air drawn from outside, because the former is warmer than the second. In consequence, it is necessary to close the air inlet valve 13.

In this first broad case, the message addressed by the processor 18 to the controller 16, after processing of the set of measurements, indicates to the processor that it is necessary, firstly to position the air inlet valve 13 in either its open or its closed position, and secondly that it is necessary to put the cold loop into operation at full power, that is to say by commanding the compressor to work at maximum pressure.

(II) If the condition "S1–E1>0" is verified, so that the error in the value of temperature between the required temperature value TC and the measured value of the inside temperature is lower than the limit threshold (i.e. T1=TC), which means that the objective of the adjustment has been achieved, the adjustment is in a phase which is referred to as the stabilised phase. In consequence, whatever the result of the second comparison, it is necessary to close the air inlet valve 13.

In this second broad case, the message addressed by the processor 18 to the electronic controller 16 indicates to the latter that it is necessary, firstly to put the air inlet valve 13 in its closed position, and secondly to put the cold loop into operation by using a compressor pressure which is computed according to a correspondence table and in accordance with the difference between the temperature values TC and T1.

In every case, complete processing of a set of measurements (T1 and T2) by the processor 18, together with the action of the electronic controller 16, constitute an adjustment control cycle. Following an adjustment control cycle there is a period of adaptation, of a predefined duration, in the course of which regulation is carried out with constant adjustments. After this adaptation, the processor 18 performs a further adjustment control cycle, which will commence with a fresh interrogation of the sensors, and which will be achieved by a new command, or an identical command, addressed to the air inlet valve 13, so that the latter will either modify or retain its previous setting. The number of cycles of adjustment, or regulation, is unlimited until the user informs the data unit that he wants to turn off the air conditioning, or until the user withdraws the ignition key.

The proposed installation may be constructed in a more sophisticated form which additionally enables the humidity in the cabin to be adjusted. In this version, the two temperature sensors 20 and 21 are provided as in the simple version described above; but in addition, two sensors for measuring absolute humidity, 25 and 26, are provided. The humidity sensor 25 is located inside the cabin, preferably beside the first temperature sensor 20, while the other humidity sensor 26 is located on the outside of the bodywork of the vehicle, preferably beside the second temperature sensor 21. The two humidity sensors are connected to the processor 18 through cables 22 which are such as to permit two-way signal traffic. However, again it is also possible to provide a wireless connection between the humidity sensors and the processor.

Each humidity sensor gives a measurement signal Hj representing the absolute humidity (H3, H4) at the location of the sensor, the signal being in the form of electrical signals which are processed in the same way as the temperature signals described above. Accordingly, there may be a step of putting the signals into the required form before they are made use of.

The preferred method of operation of this version of the system is as follows. First, the procedure of setting and memorizing the required value of temperature, described above, is carried out. The processor 18, informed by the reception of the required temperature value TC, then interrogates the two temperature sensors 20 and 21 and the two humidity sensors 25 and 26. The sensors 25 and 26 will henceforth be referred to as the third and fourth sensors respectively. This interrogation is carried out either simultaneously, or in four steps, or in two steps. It is performed simultaneously if the installation is equipped with a processor-sensor interface of the parallel type. The interrogation is carried out in four steps if the installation is equipped with a serial type interface, and in two steps if the two internal sensors 20 and 25 are interrogated first, with the external sensors 21 and 26 being interrogated afterwards.

The four measured values T1, T2, H3 and H4, obtained respectively from the first sensor 20, the second sensor 21, the third sensor 25 and the fourth sensor 26, are then memorized in the memory 24 of the processor after any operation of putting the signals into the required form, as indicated above, has been carried out. The memory 24 contains the temperature error limit threshold S1, and also a humidity error limit threshold S3 and a second temperature error limit threshold S2. S3 represents a temperature error threshold beyond which it is considered that the inside and outside temperatures are equal, while S2 is a humidity error threshold beyond which it is considered that the inside and outside values of humidity are equal.

As described above, at least one of these two thresholds can be replaced by equipping the processor with a programming input and output.

On receipt of the measured value of the inside temperature T1, the processor 18 carries out a first subtraction between TC and T1, which provides a first temperature error E1 which is memorized in the memory 24 in a predefined position. The processor 18 then carries out a first comparison between the first temperature threshold S1 and the absolute value of the error E1. This comparison again consists of a subtraction. Subsequently, or at the same time, a second comparison is carried out between the inside temperature T1 and the outside temperature T2, together with a third comparison between the inside humidity H3 and the outside humidity H4.

These results are memorised in the memory 24. The processor then performs a fourth comparison, between the absolute value of the result of the third comparison and the humidity limit threshold S3, the result of which is again memorized in the memory 24. Finally, the processor 18 carries out a fifth comparison, between the absolute value of the result of the second comparison and the second temperature limit threshold S2, the result of this fifth comparison being also stored in the memory 24. All of these comparisons are carried out in this example, as before, using the electronic subtractors 23 having two inputs and one output.

Once the five results of the comparisons described above have been computed and stored, the processor 18 performs two operations EH and ET.

The first operation EH enables the energy necessary in order to reduce the higher of the two values of humidity to the level of the lower value to be determined. This operation can be expressed as follows:

$$EH = Abs\ (H3-H4) * 2500\ [\text{in J/Kg of air}]$$

The abbreviation Abs represents the absolute value.

The second operation ET enables the energy necessary to reduce the higher of the two temperature values to the level of the lower value to be determined. This operation can be expressed as follows:

$$ET = Abs\ (T1-T2) * 1000\ [\text{in J/Kg of air}]$$

The abbreviation Abs again represents the absolute value.

These values ET and EH now being known, the processor 18 carries out a sixth and last comparison, this time between ET and EH, the result then being stored in the memory 24. This sixth comparison is again preferably carried out using the electronic subtractor 23 having two inputs and one output.

According to the results of the first to sixth comparisons, the processor 18 is arranged to address to the electronic controller 16 a message instructing it to act on the air inlet valve 13, by putting the latter either in an open position, in which only fresh air from outside can be treated by the installation, or in a closed position in which only recirculated air from inside the cabin can be treated by the installation. Opening of the valve will tend to reduce the inside temperature rapidly, and also its absolute humidity, when the inside temperature is higher than the outside temperature.

As in the previous version of the installation, two broad alternative cases (I) and (II) now present themselves, as follows:

(I) If the condition "S1−E1<0" is verified, so that the difference between the required temperature value TC and the measured value of the inside temperature T1 is greater than the first limit threshold of temperature S1, which means that the aim of the adjustment has not been achieved, the adjustment is then in a starting phase. In this event, there are here four possibilities, set forth as (a) to (d) as follows.

(a) The conditions "Abs(T1−T2)−S2<0" and "Abs (H3−H4)−S3<0" are verified, so that the aim of the humidity adjustment has been achieved (i.e. H3=H4, and T1=T2), but it is still necessary to bring the inside temperature T1 closer to the required value of temperature TC. In consequence, regardless of the other results, it is necessary to close the air inlet valve 13 so that only recirculated internal air can be used in the installation;

(b) The conditions "Abs(T1−T2)−S2>0" and "Abs (H3−H4)−S3>0" are verified, so that neither the objective of the temperature adjustment nor that of the humidity adjustment has been achieved, because the two error values are greater than their respective limiting threshold values (i.e. T1≠T2 and H3≠H4). There are now, in this case, two possibilities, as follows:

(b1) if the condition "T1−T2>0" is verified, then, regardless of the other results, it is necessary to open the air inlet valve 13 so that only fresh air, colder than recirculated air from inside, is used; or (b2) if the condition "T1−T2<0" is verified, it is then necessary to close the air inlet valve 13 so that only recirculated internal air, colder than the fresh air from outside, is used.

(c) The conditions "Abs(T1−T2)−S2<0" and "Abs (H3−H4)−S3>0" are verified, so that T1=T2, but H3≠H4. Here there is a conflict of regulation which is resolved in one of the following two ways:

(c1) if the condition "ET−EH>0" is verified, the air inlet valve 13 is then closed; but (c2) if the condition "ET−EH<0" is verified, the air inlet valve 13 is opened.

(d) If the conditions "Abs(T1−T2)−S2>0" and "Abs (H3−H4)−S3<0" are verified, so that H3=H4 but T1≠T2, there is then a conflict of regulation which is resolved in one of the following two ways:

(d1) if the condition "ET−EH>0" is verified, the air inlet valve 13 is opened; but (d2) if the condition "ET−EH<0" is verified, the air inlet valve 13 is then closed.

In this first broad case (I), the message addressed by the processor 18 to the electronic controller 16, after the set of measured values has been processed, indicates to the processor that it is necessary, firstly to put the air inlet valve 13 into either its open or its closed position, and secondly that it is necessary to put the cold loop into operation at maximum power, that is to say by instructing the compressor to operate at maximum pressure.

(II) If the condition "S1−E1>0" is verified, so that the difference between the required value of temperature TC and the measured value of the inside temperature is below the limiting threshold, which means that the object of the adjustment has been achieved, the adjustment is in its stabilised phase. In consequence, regardless of the result of the other comparisons, it is necessary to close the air inlet valve 13.

In this second broad case (II), the message addressed by the processor 18 to the electronic control means 16 indicates to the latter that it is necessary, firstly, to put the air inlet valve 13 into its closed position, and secondly, that it is necessary to put the cold loop into operation, using a compressor pressure which is computed as a function of a correspondence table and of the difference in temperature between the values TC and T1.

The operation of this more sophisticated version of the installation, after a cycle of adjustment control and a period of adaptation having a predefined duration, is identical to that described above in connection with the more simple version not having the humidity sensors.

It will be clear that in the more sophisticated version, the two sensors inside the vehicle, and the two sensors on the outside of the vehicle, may be made in the form of pairs of sensors. In addition, in the embodiments described above, subtractors are used to perform the various comparisons, but it will be understood that use may alternatively be made of voltage comparators or current comparators having two inputs and one output.

In addition, in the two versions proposed above, one or more comparators may be provided, these being connected in series and/or in parallel in order to carry out all of the comparisons. According to the design chosen, a comparator could be connected for example to the input of the processor which receives the measured values of temperature and humidity, and to at least one of a further comparator and/or the memory 24; or again, it may be connected only to further comparators, or even to further comparators and also to the output of the processor.

Moreover, in the above description, two embodiments have been described in which the inlet valve is only arranged to adopt only its two extreme positions. It will however be clearly understood that the installation may be controlled in such a way that the adjustment of temperature and/or humidity takes into account the amplitude of the calculated temperature and/or humidity errors, so as to put the air inlet valve in any one of a large number of positions. In that case, it would be necessary to provide a correspondence table for values of error and valve position, memorized by either the processor or the electronic controller.

Finally, other procedures than those described above, which would lead to practical application of the elements of the air conditioning installation proposed that are substantially identical, may be envisaged.

What is claimed is:

1. Air conditioning apparatus for a motor vehicle having a cabin for accommodating an occupant, the apparatus comprising an air circuit having a fresh air inlet for admitting air from outside and a recirculated air inlet communicating with the cabin for admitting air from the cabin; an adjustable pressure compressor downstream of said air inlets; and an adjustable position air inlet valve disposed between said air inlets and the compressor, for adjusting the relative proportions of air admitted to the compressor from the said inlets; duct means downstream of the compressor, having outlet means open into the cabin, for conveying air from the compressor to the cabin; a first sensor in the cabin for giving a first measurement signal representing the inside temperature of the cabin; a second sensor on the outside of the vehicle for giving a second measurement signal representing the outside temperature; data means in the cabin having means enabling said occupant to set therein a required value for the inside temperature of the cabin, the data means further including means for memorizing the temperature setting so made; signal processing means connected to said sensors and said data means so as to receive signals therefrom, the processing means being such as to be compute, in response to said measurement signals, a difference between the actual and required values of the cabin inside temperature; and control means connected to the processing means and to the compressor, for acting on the compressor in response to signals from the processing means so as to control the compressor pressure as a function of the outside temperature and the said computed temperature difference, wherein the processing means comprise memory means for memorizing at least one first threshold value of temperature, and comparison means for making a first comparison between the said first temperature threshold value and the absolute value of the computed temperature difference, the comparison means being such as to then carry out a second comparison between the actual values of the said inside temperature and outside temperature, the said control means being connected with the air inlet valve for controlling the position of the air inlet valve, the control means further being arranged to control the position of the said valve as a function at least of the said first and second comparisons, whereby to regulate the inside temperature of the cabin.

2. Apparatus according to claim 1, wherein the air inlet valve defines an open position and a closed position thereof, in which, respectively, only air from outside the vehicle, and only air recirculated from the cabin, is able to enter the apparatus.

3. Apparatus according to claim 1, wherein each of the said first and second comparisons consists of a subtraction operation.

4. Apparatus according to claim 1, further including a third sensor in the cabin and a fourth sensor on the outside of the vehicle, the third sensor being adapted to give a third measurement signal representing the absolute humidity of the air inside the cabin, the fourth sensor being adapted to give a fourth measurement signal representing the absolute humidity of the air outside the vehicle, and the said comparison means being adapted to perform a third comparison, between the said third and fourth measurement signals.

5. Apparatus according to claim 4, wherein the memory means of the processing means are further adapted to memorize a predetermined second threshold value of temperature and a threshold value of humidity, the said comparison means being further adapted for performing, after the said first, second and third comparisons; a fourth comparison between the absolute value of the result of the third comparison and the said humidity threshold value; a fifth comparison between the absolute value of the result of the second comparison and the second temperature threshold value; at least two operations on the absolute values of the results of the second and third comparisons respectively; and a sixth comparison between the results of said at least two operations, and wherein the said control means are adapted to position the air inlet valve as a function of the said first to sixth comparisons, whereby to adjust, besides the cabin temperature, the humidity in the cabin.

6. Apparatus according to claim 5, wherein each of the third, fourth, fifth and sixth comparisons comprises a subtraction operation.

7. Apparatus according to claim 4, wherein the said processing means are adapted to interrogate the four sensors, simultaneously or in succession.

8. Apparatus according to claim 4, wherein the said processing means are adapted to interrogate the four sensors in two stages, namely a first stage in which the first and second sensors are interrogated simultaneously, and a subsequent second stage in which the third and fourth sensors are interrogated simultaneously.

* * * * *